United States Patent [19]

McCready

[11] Patent Number: 5,078,871
[45] Date of Patent: Jan. 7, 1992

[54] MAGNETIC OIL FILTER PARTICLE TRAP

[76] Inventor: David F. McCready, P.O. Box 1971, Altoona, Pa. 16603

[21] Appl. No.: 540,196

[22] Filed: Jun. 19, 1990

[51] Int. Cl.⁵ .............................................. B01D 35/06
[52] U.S. Cl. .................................. 210/222; 210/223; 184/6.25
[58] Field of Search .............. 210/222, 223, 251, 541, 210/695, 232, DIG. 17; 55/3, 100; 184/6.25; 335/303, 305

[56] References Cited

U.S. PATENT DOCUMENTS

| | | | |
|---|---|---|---|
| 2,838,179 | 6/1958 | Thomas | 210/223 |
| 2,860,787 | 11/1958 | Pieper et al. | 210/223 |
| 2,959,832 | 11/1960 | Baermann | 210/222 |
| 2,980,257 | 4/1961 | Paton | 210/223 |
| 3,035,703 | 5/1962 | Pall | 210/223 |
| 3,121,683 | 2/1964 | Fowler | 210/223 |
| 3,124,725 | 3/1964 | Leguillon | 210/222 |
| 3,150,296 | 9/1964 | McIntosh | 335/303 |
| 3,213,335 | 10/1965 | Bourne | 317/201 |
| 3,279,607 | 10/1966 | Michaelson | 210/223 |
| 3,460,679 | 8/1969 | Llewellyn | 210/222 |
| 3,480,145 | 11/1969 | Gladden | 210/223 |
| 3,827,020 | 7/1974 | Okamoto | 335/303 |
| 4,052,312 | 10/1977 | King | 210/223 |
| 4,218,320 | 8/1980 | Liaw | 210/223 |
| 4,389,041 | 6/1989 | Kuwayama et al. | 210/168 |
| 4,446,019 | 5/1984 | Robinson | 210/223 |
| 4,450,075 | 2/1984 | Krow | 210/223 |
| 4,501,660 | 2/1985 | Hebert | 210/209 |
| 4,561,395 | 12/1985 | McMullen | 123/196 A |
| 4,629,558 | 12/1986 | Garritty | 210/130 |
| 4,689,144 | 8/1987 | Holmes | 210/130 |
| 4,705,626 | 11/1987 | Morelli | 210/130 |
| 4,826,592 | 5/1989 | Taylor | 210/223 |
| 4,894,153 | 1/1990 | Shirdavani | 210/222 |

*Primary Examiner*—W. Gary Jones
*Assistant Examiner*—Matthew O. Savage
*Attorney, Agent, or Firm*—James Creighton Wray

[57] ABSTRACT

A magnetic field is applied to an automotive engine-type oil filter canister by permanently adhering a plastic strip halfway around an outer surface of the filter canister, thereby forming a magnetic field within the filter canister attracting ferrous magnetic particles to an inner wall of the canister adjacent the ferrous magnetic strip.

5 Claims, 1 Drawing Sheet

MAGNETIC OIL FILTER PARTICLE TRAP

BACKGROUND OF THE INVENTION

As the internal combustion engine developed, the need to maintain a clean supply of lubricating oil increased. Thus, filtering mechanisms were developed through which the recirculated engine oil lubricant was directed. The filter effectively sifted the lubricant, trapping the larger pieces of worn ferrous metallic particles, preventing them from constantly being recycled through the lubrication system and repeatedly wearing away at the friction surfaces inside the internal combustion engine. The majority of abrasion particles, however, were not trapped or sifted out of the lubricant because their size was much smaller than the filtering mechanism.

Today, the filtering mechanisms have evolved into disposable canister through which the oil is passed, and particles greater than 20 microns in size are trapped and collected. The present day canister filter is deficient in removing abrasive ferrous particles of less than 20 microns in size.

The internal combustion engine produces a substantial quantity of sub-micron sized ferrous particles through the normal wear characteristic which spans the life of the engine itself. A major part of the wear problem is the self-destructive nature of small ferrous abrasion particles being recycled continuously to the friction bearing surfaces by the engine's own lubricating system.

The removal of micron and sub-micron sized ferrous metal abrasive particles would greatly reduce engine wear and increase the useful life of the lubricating oil. The benefit to the user would be to reduce maintenance intervals and engine overhaul period cycles. The internal combustion engine utilizes several types of metal such as aluminum, copper, tin, lead, chromium and magnesium. These are the softer and very ductile/malleable metals and their wear rate is greatly increased because of the micron and sub-micron, harder and more abrasive ferrous metal wear particles they are exposed to. By elimination of the ferrous metal particles, the more ductile and softer metals will remain intact for a substantially long period of time. Thus by the removal of the highly abrasive ferrous metal components only from the lubrication system, the overall internal combustion engine life is greatly improved.

SUMMARY OF THE INVENTION

The invention herein described takes advantage of the filter canister construction of ferrous material which can be influenced by magnetic lines of force to become magnetic. Since the canister holding the filter receives the incoming contaminated oil, the magnetic field around the canister will cause the sub-micron sized ferrous abrasion particles to adhere to the inside of the magnetized filter canister, preventing the ferrous abrasion particles from continuously being recycled to the engine's friction bearing surfaces, thereby greatly reducing the wear rate of the internal combustion engine.

A magnetic strip for attachment to an oil filter canister comprises a heat resistant plastic tape for application to an outer cylindrical surface of a canister-type automotive oil filter, and a heat resistant plastic strip about 1 inch wide by about 6 inches long for partially wrapping around about one half circumference of an oil filter canister and for attracting ferrous and other magnetic particles to an inner wall of the canister adjacent the strip. The strip has an outer plastic surface about 3 to 5 ml. thick, a magnetically impregnated elastopolymer approximately 0.120 inches thick fixed on one face of the plastic tape, and an adhesive bonding material fixed to a face of the magnetically impregnated elastopolymer opposite the face which is adhered to the plastic tape for permanently adhesively bonding the strip to an outer circumferential wall portion of the oil filter canister.

The apparatus further comprises a temporary protective sheet connected to the adhesive bonding material, and a plastic package surrounding the magnetic strip and the protective sheet for opening to present the magnetic strip and protective sheet.

An oil filter magnetic particle trap comprises a magnetically impregnated elastopolymer strip for wrapping around an automotive-type internal combustion engine disposable oil filter canister on an outside thereof for thereby trapping ferrous metal particles on an inside of the canister, where the particles are held in place by the permanent magnetic field induced in the canister covering by the surrounding magnetic tape.

The process for trapping ferrous metal particles on an inside of an automotive-type oil filter canister comprises permanently adhering a magnetically impregnated elastopolymer strip partially around a circumference of an outside of the canister and inducing a magnetic field in the canister focused on an interior wall of the canister, and attracting ferromagnetic particles by the magnetic field to the wall of the canister directly inside of an outer surface on the canister to which the magnetic strip is permanently adhered.

A magnetic field is applied to an automotive engine-type oil filter canister by permanently adhering a plastic strip halfway around an outer surface of the filter canister, thereby forming a magnetic field within the filter canister attracting ferrous magnetic particles to an inner wall of the canister adjacent the ferrous magnetic strip.

The invention utilizes permanently magnetized particles embedded into an elastomer-polymer that is capable of being formed, either by wrapping or applying by other means a covering of sufficient thickness and magnetic strength to create a magnetic field on the filter canister. This can be accomplished by arranging the elastopolymer containing the permanently magnetized particles into a strip of material to which an adhesive backing has been attached, thereby permitting the filtered canister to be wrapped by this magnetic tape.

The product of the invention may be secured around an oil filter cartridge by a long twist tie, or may be held by the magnetic bond in a longitudinal or axial direction or in a circumferential direction. In the latter case a relatively soft plastic matrix may be used, or the magnetic strip may have a preformed longitudinal curvature. The latter embodiments are particularly useful for attachment to cartridge-type filter replacements mounted in permanent receivers.

The magnetic strip of the present invention is equally suited for application to an automatic transmission fluid sump pan, which is periodically removed, cleaned and replaced in ordinary maintenance procedures and when periodically servicing the transmission. The sump pan of the transmission fluid is the place where the fluid is gathered, held and slowed before it is pumped through a filter back into the transmission circulating system.

These and further and other objects and features of the invention are apparent in the disclosure, which includes the above and ongoing written specification, with the claims and the drawings.

DETAILED DESCRIPTION OF THE DRAWINGS

Figure 1:
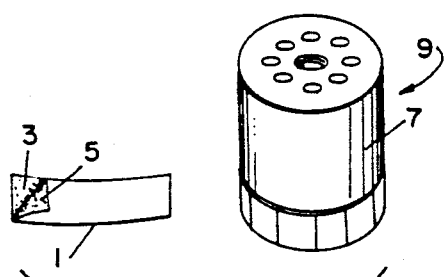
FIG. 1 is a schematic representation of an oil filter canister and a magnetic strip to be applied to the outside of the canister.

In FIG. 1, a magnetic strip of the present invention is generally indicated by the numeral 1. The magnetic strip has an adhesive 3 on its inner face and a slick protective sheet 5 for removing from the adhesive strip 3. The strip is applied on the outer wall 7 of a canister-type oil filter generally indicated by the numeral 9.

Figure 2:
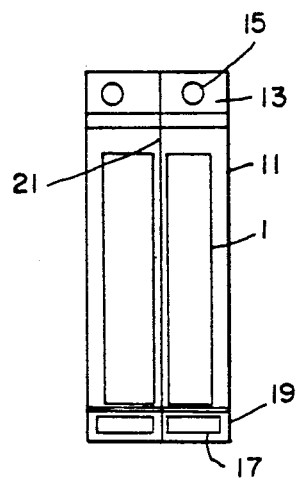
FIG. 2 shows the packaging of strips, for example two parallel strips in a sealed, sleeve-type package.

As shown in FIG. 2, the magnetic strips 1 are packaged in a sleeve-type package 11 having a header card 13 and a hole 15 for hanging the sleeve on a conventional retailing hook. The sleeve-type package contains an equal number of vial and sponge-type activators 17 in a portion 19 of the sleeve, which is separated from the remainder of the sleeve. Plural sleeves are shown in FIG. 2 separated by a parting line 21 to show conventional machine-type continuous packaging of the devices. When the strips are packaged more than one to a sleeve, the sleeves have a sealed parting line 21 so that removing one strip does not open the sealed container around the second strip to maintain absolute cleanliness of the strip and its environment, so that a permanent seal may be formed when the strip is placed on the outer wall of the canister.

The optional vial and sponge-type activator 17 may be used to spread an activator liquid across the surface of the usually painted canister. The activator materials etch the surface of the painted canister and may activate the adhesive material 3 on the strip to form a permanent bond to the canister which cannot be removed. The permanent bond ensures a continuous hold of the strip on the canister so that the particles attracted to the inner wall of the canister by the magnetic force of the strip are not released back into the circulating oil.

Figure 3:
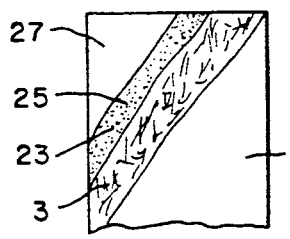
FIG. 3 shows one corner of the magnetic strip.
Figure 4:
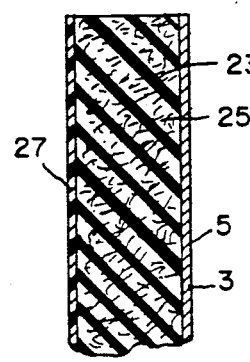
FIG. 4 is a partial cross-section of the magnetic strip.

FIG. 3 shows a partial corner view in which portions of the materials have been removed for an understanding of the invention. The protective sheet 5 overlies an adhesive layer 3, which in turn overlies the relatively thick elastomeric layer 23 in which magnetic particles 25 are embedded. The thick polymeric matrix 23 for the magnetic particles 25 is firmly adhered to a thin protective tape surface 27, which remains in place during use of the magnetic strip. The elements and the general relativity of their thickness are shown in FIG. 4.

Strip 1 is attached to one half of a circumferential portion of an external surface 7 of the oil filter canister 9. The canister 9 has an upper surface 31, which is usually provided with an elastomeric sealing ring 32. The canister is mounted by a central outlet opening 33 with threads 35, which engage a threaded oil line spigot and hold the oil filter canister assembled to the automobile. Outer openings 37 form an array of inlet openings. In a conventional embodiment, oil enters the filter canister through inlet opening 37 and flows along the wall of the canister, inward through one or more pleated particle-catching filters held between supporting screens, and then outward through the central opening 33. A valve at a bottom of the conventional filter opens when the filter element becomes plugged to allow oil to pass through the valve to the outside of the filter for return to the engine through opening 33.

The filter is intended to filter particles of a minimum particle size. Below that size particles may freely flow through the filter. When a filter is made to filter out particles of extremely small sizes, the filter increases resistance, which is an undesirable quality. Consequently, a balance is struck allowing minute particles to pass through the filter.

Figure 6:
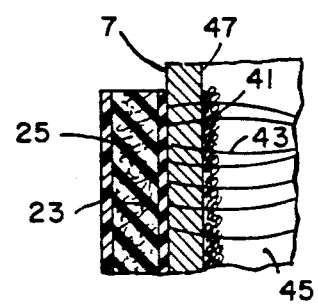
FIG. 6 is a cross-sectional detail of a part of a strip on a part of a canister showing magnetic lines of force and adherence of particles.

Minute ferrous and other magnetically permeable and attractable particles which pass the filter are dangerous to engine operation, promoting accelerated wear. Catching those particles 41 as shown in FIG. 6 is the object of the present invention. The magnetic particles 25 embedded in the layer 23 of the strip create lines of magnet force 43, which extend into the body 45 of the filter and attract particles 41 to the inner surface 47 of the canister wall 7.

When the filter is discarded, the relatively inexpensive permanently adhered magnetic tape is discarded with the filter. That ensures that the accumulated particles remain attached to the wall of the filter and do not drain from the cartridge 9 when the cartridge is inverted to drain the cartridge for example into drip pan of a recycling oil collection system, which is conventional in oil change operations.

Figure 5:
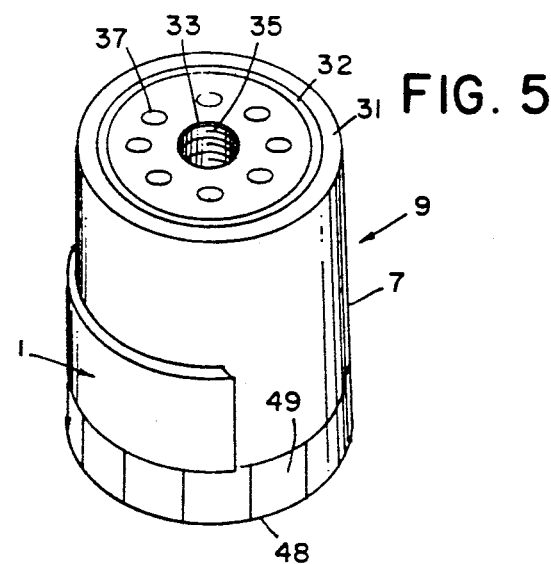
FIG. 5 shows the magnetic strip applied to an oil filter canister.

As shown in FIG. 5, it is preferred to space the strip 1 upward from the bottom 48 of the cartridge. Many cartridges are provided with angular gripping flats 49 along the bottom to aid in twisting the cartridge off and on the threaded spigot. The spacing of the tape upward from the bottom of the cartridge tends to collect more particles, which otherwise might evade the magnetic fields of force by circulating through an upper part of the filter element within the cartridge.

More than one strip may be placed upon the cartridge.

A single strip extending halfway around the cartridge has been found to be useful.

Besides being easier to apply and fitting a member of filter diameters, the semi-circular shape improves the operation of the magnetic strip and concentrates lines of force.

Cartridges are made in several sizes from about 3" to about 5" in diameter, and the single 6"×1" strip of the present invention fits all those canisters and successfully removes various particles. In the preferred embodiment, the magnetic elastopolymer is applied to the strong side of the tape between the plastic tape and a strong permanent-type bonding adhesive. The tape backing may be up to 5 ml. thick, and the permanent magnet particle containing elastomer may be about 0.120" thick, with up to a 5 ml. thickness of adhesive, making the overall strip in a preferred embodiment from about 0.125" to about 0.130" thick. Although a 6"×1" strip is preferred, any other suitable shape may be employed.

The bending of the strip in a substantial semicircle in cooperation with the canister wall tends to concentrate and direct the lines of force around the peripheral volume of the canister outside of the filter element where the filtered oil flows and where the magnetic particles which elude the filter element move.

The magnetic strip of the present invention may be applied advantageously to an automatic transmission fluid sump, which has the same function as an outer volume of a filter canister. Both sump and canister are collectively referred to herein as a receiver.

While the invention has been described with reference to specific embodiments, modifications and variations of the invention may be constructed without departing from the scope of the invention, which is described in the following claims.

I claim:

1. A magnetic strip in combination with an automotive oil filter canister, comprising a heat resistant plastic tape premanently attached to an outer cylindrical surface of said oil filter canister, said heat resistant plastic tape comprising a heat resistant plastic strip about 1 inch wide by about 6 inches long partially wrapped around about one half circumference of the oil filter canister for attracting ferrous and other magnetic particles to an inner surface of the canister adjacent the strip, the strip having an outer plastic surface about 3 to 5 ml thick, a magnetically impregnated elastopolymer approximately 0.120 inches thick fixed on one face of the plastic strip, and a permanent adhesive bonding material fixed to a face of the magnetically impregnated elastopolymer opposite the face which is adhered to the plastic strip to permanently adhesively bond the strip to the outer circumferential surface of the oil filter canister.

2. An oil filter magnetic particle trap, comprising a magnetically impregnated permanent adhesive-faced elastopolymer strip wrapped around an automotive-type internal combustion engine disposable oil filter canister and self-adhered on an outside thereof for thereby trapping ferrous metal particles on an inside of the canister, where the particles are held in place by the permanent magnetic field induced in the canister covering by the surrounding magnetic strip.

3. A magnetic strip in combination with an automotive fluid receiver, comprising a heat resistant plastic tape permanently adhered to an outer surface of said automotive fluid receiver, said heat resistant plastic tape comprising a heat resistant plastic strip about 1 inch wide by about 6 inches long attached to the receiver for attracting ferrous and other magnetic particles to an inner wall of the receiver adjacent the strip, the strip having an outer plastic surface about 3 to 5 ml thick, a magnetically impregnated elastopolymer approximately 0.120 inches thick fixed on one face of the plastic strip, and a permanent adhesive bonding material fixed to a face of the magnetically impregnated elastopolymer opposite the face which is adhered to the plastic strip to permanently adhesively bond the strip to the outer surface of the receiver.

4. An automotive fluid receiver magnetic particle trap, comprising a magnetically impregnated permanent adhesive-faced elastopolymer strip attached to an automotive-type internal combustion engine fluid receiver and self-adhered on an outside thereof for thereby trapping ferrous metal particles on an inside of the receiver, where the particles are held in place by the permanent magnetic field induced in the receiver covering by the attached magnetic strip.

5. A magnetic strip in combination with an automotive oil filter canister, comprising a heat resistant plastic strip attached to an outer cylindrical surface of said oil filter canister, the heat resistant plastic strip being about 1 inch wide by about 6 inches long and partially wrapped around about one half circumference of the oil filter canister for attracting ferrous and other magnetic particles to an inner surface of the canister adjacent the strip, the strip having an outer plastic surface and a magnetically impregnated elastopolymer fixed on the plastic strip, a permanent adhesive on a face of the magnetically impregnated elastopolymer opposite the outer plastic surface to permanently attach the strip to said outer cylindrical surface of the oil filter canister.

* * * * *